Patented Nov. 21, 1922.

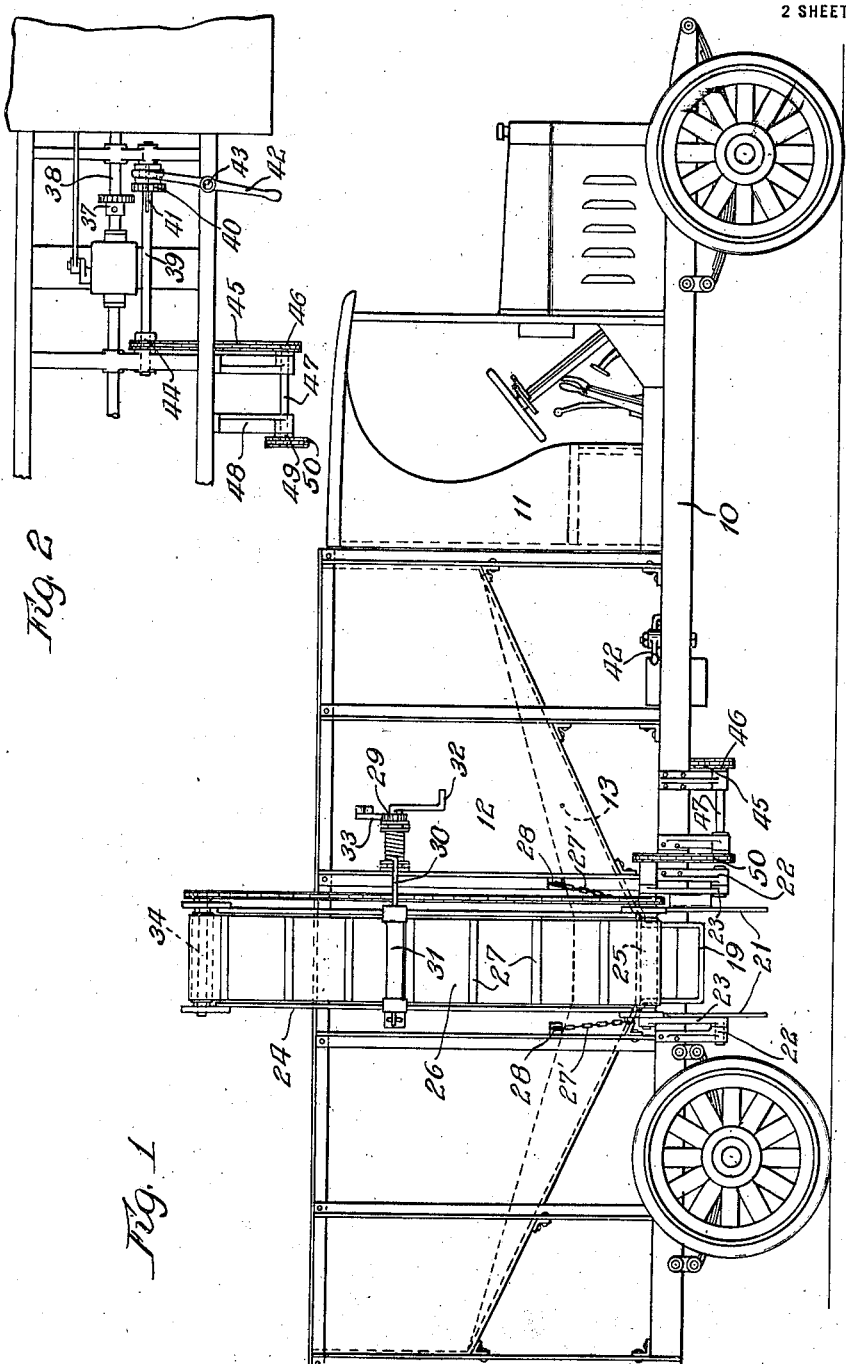

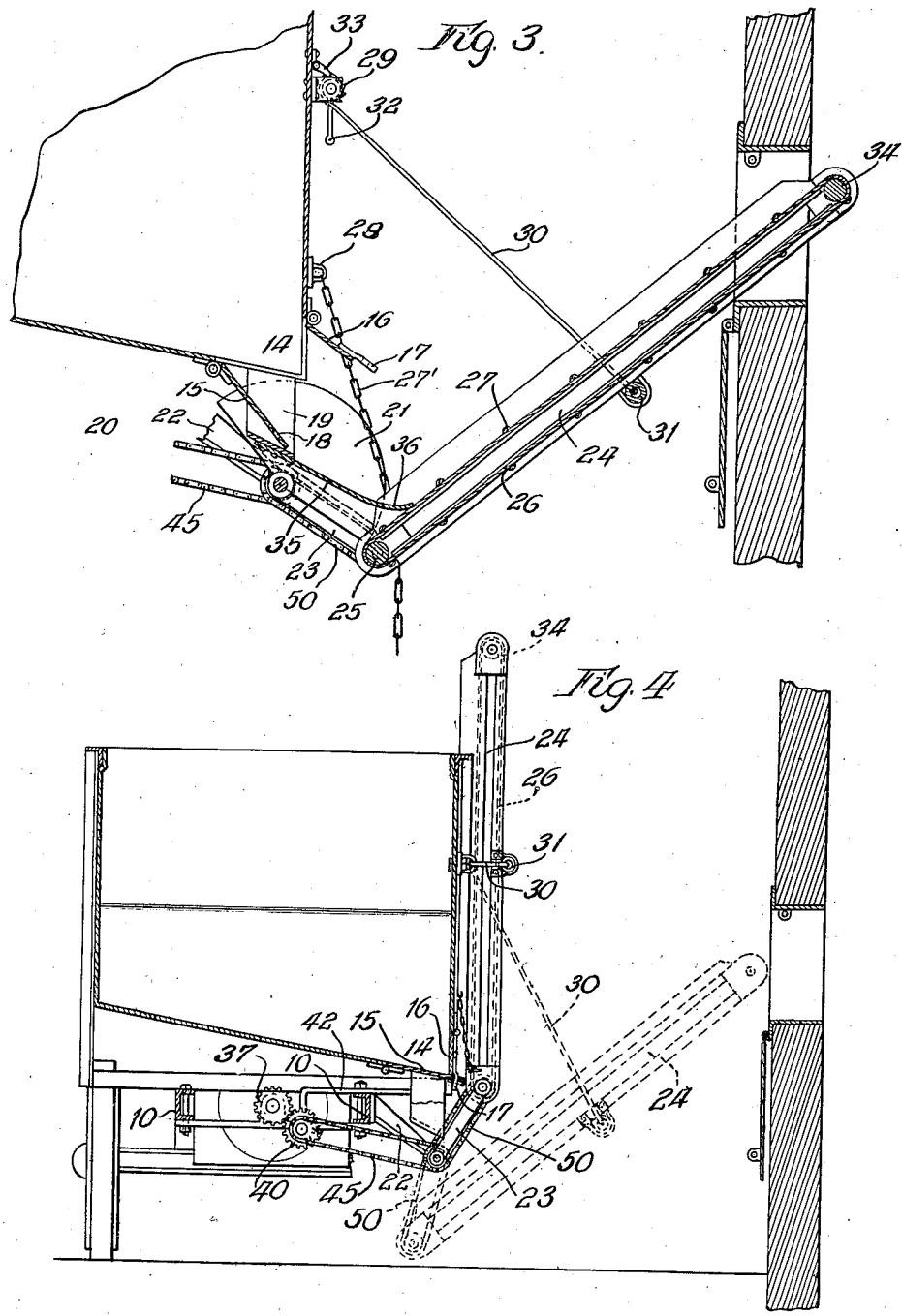

1,436,428

UNITED STATES PATENT OFFICE.

HENRY BARKMANN AND ALOIS KUTSCHA, OF CHICAGO, ILLINOIS.

TRUCK.

Application filed April 24, 1922. Serial No. 556,231.

*To all whom it may concern:*

Be it known that we, HENRY BARKMANN and ALOIS KUTSCHA, citizens of the United States, residing at Chicago, in the county of Cook and State of Illinois, have invented certain new and useful Improvements in Trucks, of which the following is a specification.

The object of this invention broadly is to mechanically deliver a load of bulk material from the body of a truck or other vehicle to a designated spot or receptacle without tilting or raising the body.

More specific an important object of the invention is to so construct the body that the load will descend by gravity to a conveniently located outlet and to provide a conveyer adjacent to the outlet that will deliver the load or any part thereof to the desired spot.

A further object of the invention is to adjustably connect the conveyer with the body or frame of the vehicle so that the delivery end of the conveyer can be conveniently placed at suitable elevations and at different distances from the vehicle.

A further object of the invention is to provide novel means for feeding the material from the body to the conveyer in proportion to the speed of the conveyer.

A further object of the invention is to provide means for driving the conveyer that will be operable in various adjusted positions.

Other objects of the invention will become apparent as the description is read in connection with the accompanying drawings illustrating a selected embodiment of the invention in which Fig. 1 is a side elevation of a motor truck equipped with a body and a conveyer according to our invention;

Fig. 2 is a plan view of a fragmentary portion of the truck illustrating the manner of driving the conveyer;

Fig. 3 is a fragmentary view illustrating one position of the conveyer when used to deliver coal through a door or window in a wall;

Fig. 4 is a transverse section of the truck shown in Fig. 1 showing the conveyer in solid lines as it would be during travel and showing it in dotted lines to indicate a transitory position while being inserted in a window.

Referring to Fig. 1, 10 indicates the chassis of a motor truck having a cab 11 supported thereon and equipped with a body 12 adapted to contain bulk material such as coal, crushed stone and the like. The bottom of the body 13 is preferably made so as to incline from the front, the rear and one side and thereby deliver all the load by gravity to a conveniently located outlet 14 at the side of the vehicle though it is sufficient if the body is arranged in any manner to concentrate the load at an outlet. The outlet here shown is closed by a bottom door 15 and a side door 16 the latter having a hasp 17 adapted to pass through an opening 18 in the former and receive a key or the like for securing the doors in a closed position. Beneath the outlet is a bracket 19 substantially U-shaped in the general form and having its bottom 20 inclined towards the side of the body. The door 15 when in open position rests at its outer end on this bracket and in conjunction with the swinging sides 21 carried by the bracket or otherwise supported adjacent to the discharge form a chute for delivering the material to the conveyer.

On each side of the discharge, the frame or body of the truck is provided with a bracket 22, each of which is pivoted to one end of a link 23, the other end of which is pivoted to one end of a conveyer 24. As illustrated the links 23 have bearings receiving the shaft 25 through which power is transmitted to the belt 26 of the conveyer. The particular construction of the conveyer is largely immaterial to our invention so long as it includes the equivalent of a belt 26 having battens or other load carrying supports 27 and traveling from one end to the other so as to convey the material. In order to support the conveyer in operative position such as that shown in Fig. 3 we supply a chain or chains 27' secured to the body at 28 and adapted to engage hooks or the like adjacent to the lower end of the conveyer; and in addition we mount a drum on the side of the body 12 and equip it with a rope or ropes 30 connected in any suitable manner with the conveyer at a suitable point as indicated at 31. The drum may be operated by the crank 32 or the like and may be locked in adjusted position by a pawl 33 or any other suitable means. These chains and ropes permit the conveyer to be conveniently supported in any position within the range required in service. When in use they will support it in such a position as illustrated in Fig. 3 and when traveling they will hold it as indicated in Fig. 4; at the same time, they will permit the conveyer to be manipulated freely in locating the delivery end 34 as conditions may require. The side plates 21 are connected with the conveyer or the links 23 so as to move as the conveyer is shifted to assure a proper delivery of the material from the discharge to the conveyer. We have shown these side pieces as curved in the arc of a circle, but they may be of any shape made necessary by the peculiarities of particular material. Their function is to form the sides of a chute in cooperation with the door 15 and the flapper 35 and their shape and size will vary according to the material to be handled.

In order to insure that the bulk material passing through the discharge 14 will reach the conveyer we secure to the bracket 19 a flapper 35 having its free end 36 in position to cooperate with the battens 27 and give the material a slight up and down movement that will cause it to feed on to the conveyer.

The conveyer may be driven in any suitable manner but we preferably drive it from the propeller shaft of the truck. In the drawings we have illustrated one way of effecting this result. A gear 37 is fixed to the propeller shaft 38 in front of the transmission so that, with the transmission in neutral and the clutch engaged, the gear 37 will be driven from the motor. A parallel shaft 39 is supported in suitable brackets adjacent to the propeller shaft and provided with a sliding gear 40 secured thereto by a key 41 or in any other suitable manner. A shifter fork 42 pivoted at 43 is engaged with the gear 40 so that it may be moved into mesh with the gear 37 or shifted into the idle position shown in Fig. 2 as the occasion may require, and suitable means may be provided for holding the gear in its position. The rear end of the shaft 39 is equipped with a sprocket 44 driving a chain 45 which runs over the sprocket 46 carried by a jack-shaft 47 supported by the brackets 48. The shaft 47 is aligned with the pivots of the links 23 so that it is possible to drive the conveyer from the shaft regardless of the position of the conveyer relative to the truck. As shown the rear end of the shaft 47 is equipped with a sprocket 49 driving a chain 50 running over the sprocket on the shaft 25 of the conveyer. This makes a very convenient driving connection which can be applied to a large number of vehicles but of course it will be varied to suit conditions.

With our invention the chute may be placed on any form of chassis and may have any desired shape so long as the load is concentrated by gravity and delivered to a suitable outlet. A conveyer mounted as above described adjacent to the outlet can be set at any angle that will be required in service and can be driven efficiently, regardless of its position, by the motor of the truck. When it is necessary to deliver coal or other material through a hole in the wall or a window the driver can stop the machine in approximate position and swing the conveyer to the position indicated on the dotted lines in Fig. 4 and then enter the delivery end to a convenient distance where it will be properly supported by the chains 27 and the cables 30. The driving gear is always engaged with the conveyer regardless of its position and will operate the conveyer efficiently at any angle within the limits of the mounting.

By driving the conveyer from the power of the motor and providing the flapper 35 to feed the coal or other material in proportion to the speed of the conveyer, the entire load of several tons can be delivered in a very short time without any shoveling or other assistance on the part of the driver. The conveyer is very light and the peculiar mounting makes it very easy to move from the traveling position to an unloading position or the reverse.

This mounting for a conveyer can be applied to conventional truck bodies, but we prefer to apply it to bodies sufficiently narrow to permit the conveyer, when in the position shown in Fig. 4, to lie within the vertical plane passing through the hub caps of the supporting wheel. When the body is built with a bottom like that shown in the drawing, it can extend slightly further to the left of the chassis than to the right while maintaining the center of the load over the center of the chassis and this will permit the conveyer to be brought within the line of the hub caps.

By connecting the inner end of the conveyor to the truck by means of the links 23, which are pivoted both to the conveyor and the truck, the conveyor may be adjusted both laterally and vertically with respect to the outlet and it may be swung about two horizontal axes. This connection or mounting permits free adjustment within the limits of the links and makes it possible to locate the delivery end of the conveyor in some position suited to almost every condition that will be met in practice. This sort of connection also permits the driving mechanism for the conveyor to be continuously engaged and ready for operation at all times which results in a considerable saving of time and labor. However, we do not wish to be limited to the particular connection or mounting shown or in any other manner except as may be necessary to distinguish from the prior art.

The flapper 35 may be made of any suitable material and mounted in any desired way but we have found it very satisfactory to use a piece of flexible belting secured direct to the bracket 19.

We are aware that changes may be made in the form, construction and arrangement of the invention, as set forth in the selected embodiment herein, without departing from the scope or sacrificing any of its material advantages, and we therefore reserve the right to make all such changes as fairly fall within the scope of the following claims.

We claim:

1. In a truck, the combination of a chassis, a body thereon having an outlet, driving means on the chassis for propelling the truck, a conveyor, means for supporting the conveyor permitting it to move bodily relative to said truck, means for driving the conveyor including an element having a relatively fixed position on the truck and continuously engaged driving connection between said element and said conveyor, and means for effecting a driving connection between said element and the driving means.

2. In a truck, the combination of a body having an outlet therein, a conveyor, and means for supporting the conveyor on the truck permitting it to have bodily movement vertically and laterally relative to the outlet and to swing pivotally.

3. In a truck, the combination of a chassis, a body thereon having an outlet, a swinging frame pivoted adjacent to the outlet, a conveyor having its receiving end pivoted to the frame, driving means for the truck and means for driving said conveyor from said driving means including an element rotating about an axis fixed with respect to said truck, and a continuous driving connection between said element and the conveyor.

4. In a truck, the combination of a body having an outlet, a conveyor adjacent to said outlet, an adjustable mounting for said conveyor permitting it to have bodily movement vertically and laterally with respect to said outlet, and means for delivering material from said outlet to said conveyor in a plurality of positions.

5. In a truck, the combination of a chassis, a body on the chassis having an outlet at one side, a conveyor, a frame pivoted to the receiving end of the conveyor and also pivoted to the chassis adjacent to said outlet, driving mechanism for the truck, and means for driving the conveyor including a clutch for engagement with said driving mechanism.

6. In a truck, the combination of a chassis, a body mounted thereon and having an outlet at the bottom thereof, a frame having one end pivoted on the truck below said outlet, a conveyor having its receiving end pivoted to the other end of the frame, means for directing material from the outlet to the conveyor, means for adjustably supporting the frame, and means for supporting the delivery end of the conveyor.

7. In a truck, the combination of a chassis, a body on said chassis, a door in the bottom of said body mounted to swing downwardly, means for supporting the door in an inclined position, links pivotally mounted below said door, a conveyor having its receiving end pivoted to said links, means for adjustably supporting said links, and means for supporting the delivery end of said conveyor.

8. In a truck, a body having an outlet, a conveyor adjacent to said outlet, a mounting for said conveyor permitting it to be adjusted vertically and laterally with respect to the outlet, means for delivering material from said outlet to said conveyor in a plurality of adjusted positions, and means carried by the truck and continuously engaged with the conveyor for driving the conveyor.

9. In a truck, the combination of a body having an outlet, a conveyor adjacent to said outlet, means for mounting the conveyor on the truck permitting it to be adjusted vertically and laterally with respect to the outlet, and a flapper interposed between the outlet and the conveyor and having one end resting on the conveyor.

10. In a truck, the combination of a chassis, a body thereon having an outlet at one side, a swinging frame pivoted on the truck adjacent to said outlet, a conveyor having its receiving end pivoted to said swinging frame, means for adjustably supporting the swinging frame, and means for supporting the delivery end of the conveyor.

11. In a truck, the combination of a body having an outlet, a conveyor having its inner end adjacent to said outlet, a mounting for said conveyor permitting the inner end thereof to swing laterally and vertically with respect to said outlet, and means carried by said truck for driving said conveyor.

12. In a truck, the combination of a body having an outlet therein, a swinging frame pivoted to the body adjacent to the outlet, a conveyor pivoted to said swinging frame, and a flapper secured to the body adjacent to said outlet and resting at its outer end on the conveyor.

13. In a truck, the combination of a body having an outlet, a chute communicating with the outlet, a swinging frame pivoted to the body adjacent to the chute, a conveyor pivoted to the swinging frame, and a yielding flapper secured to the body adjacent to the chute and cooperating with said conveyor to feed material from said chute to the conveyor.

14. In a truck, the combination of a chassis, a body thereon having an outlet, a conveyor mounted to swing about two independent parallel axes and having one end adjacent to said outlet, a jack shaft on said chassis, and a continuously engaged driving connection between said propeller shaft and said conveyor.

15. In a truck, the combination of a chassis, a body thereon having an outlet, a conveyor, means for mounting the conveyor adjacent to the outlet and permitting it to swing bodily about two independent parallel axes, a propeller shaft on said chassis, a jack shaft, and a continuously engaged driving connection between said jack shaft and said conveyor.

16. In a truck, the combination of a chassis, a body thereon having an outlet, a conveyor bodily adjustable laterally and vertically with respect to said outlet, a shaft on said chassis, and a continuously engaged driving connection between said shaft and said conveyor.

17. In a truck, the combination of a chassis, a body thereon having an outlet, a conveyor having its inner end adjacent to said outlet, a swinging frame pivoted to said chassis adjacent to said outlet and pivoted to said conveyor adjacent to its inner end, said pivoted connections including parallel axes, a propeller shaft on said chassis, a jack shaft on said chassis, a disengageable driving connection between said propeller shaft and said jack shaft, and a continuously engaged driving connection between said jack shaft and said conveyor.

18. The combination of a vehicle chassis, a swinging frame pivoted thereto, a conveyer pivoted to said frame, a shaft aligned with the pivots between the swinging frame and the chassis, a driving connection between said shaft and the conveyer and means for driving said shaft.

19. In a truck, the combination of a body having an outlet, a conveyor adjacent to said outlet, a rotatable shaft having a fixed position on the truck, a continuously operated driving connection between said shaft and said conveyor, a mounting for said conveyor permitting it to be adjusted bodily toward and away from said truck, and means for delivering material from said outlet to said conveyor.

20. In a truck, the combination of a body having an outlet therein, a door for said outlet adapted to swing downwardly therefrom, a conveyor having a swinging connection with the body adjacent to the outlet, and side pieces movable with said conveyor and cooperating with said door to form a chute.

21. The combination of a vehicle body with a discharge therein, a swinging door adjacent to said discharge, a conveyer pivotally mounted adjacent to said discharge and pivoted side pieces connected with said conveyer and adapted to cooperate with said door to form a chute.

22. In a truck, the combination of a body having an outlet, a conveyor adjacent to said outlet, a mounting for said conveyor permitting it to be adjusted bodily toward and away from said body, and means for delivering material from said outlet to said conveyor in a plurality of adjusted positions to the conveyor.

23. In a truck, the combination of a body having an outlet, a conveyor adjacent to said outlet, a mounting for said conveyor permitting it to be adjusted bodily toward and away from said body, a rotatable shaft on the truck, and a continuously engaged driving connection between said shaft and said conveyor.

24. In a truck, the combination of a body having an outlet, a conveyor adjacent to said outlet, a mounting for said conveyor permitting it to be adjusted bodily toward and away from said body, a chute for delivering material from said outlet to said conveyor, a rotatable shaft on said truck, and a continuously engaged driving connection between said shaft and said conveyor.

HENRY BARKMANN.
ALOIS KUTSCHA.